W. C. ZELLE.
TILLING MACHINE.
APPLICATION FILED JUNE 17, 1912.
1,230,261.
Patented June 19, 1917.
6 SHEETS—SHEET 5.
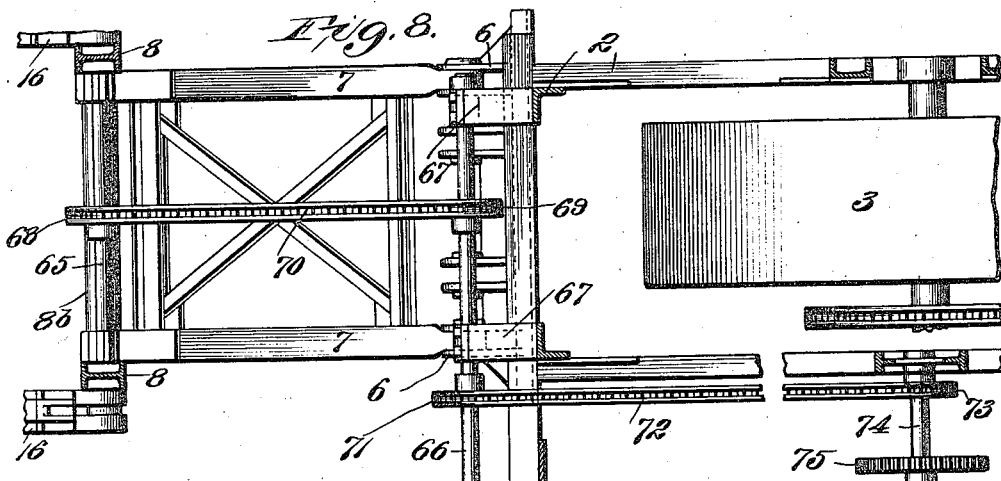
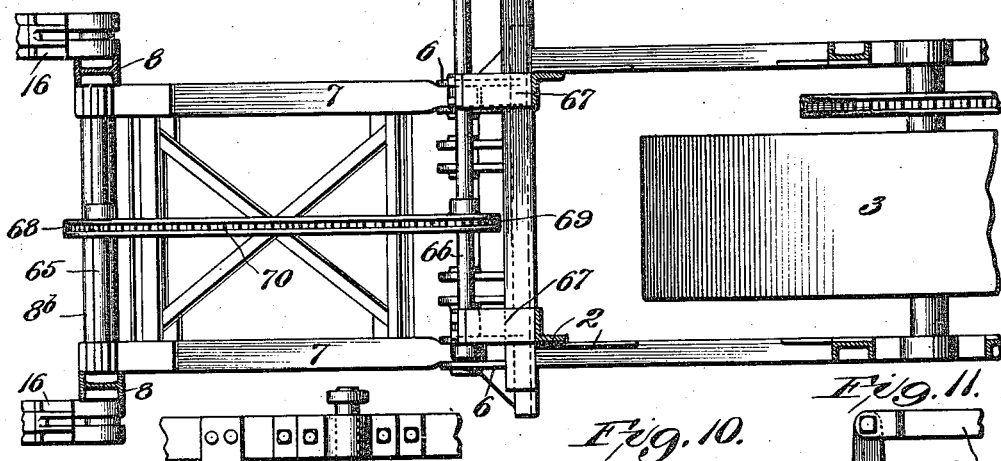
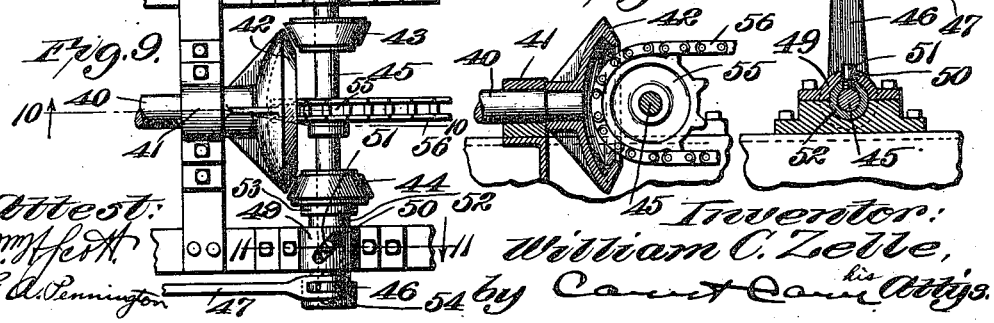

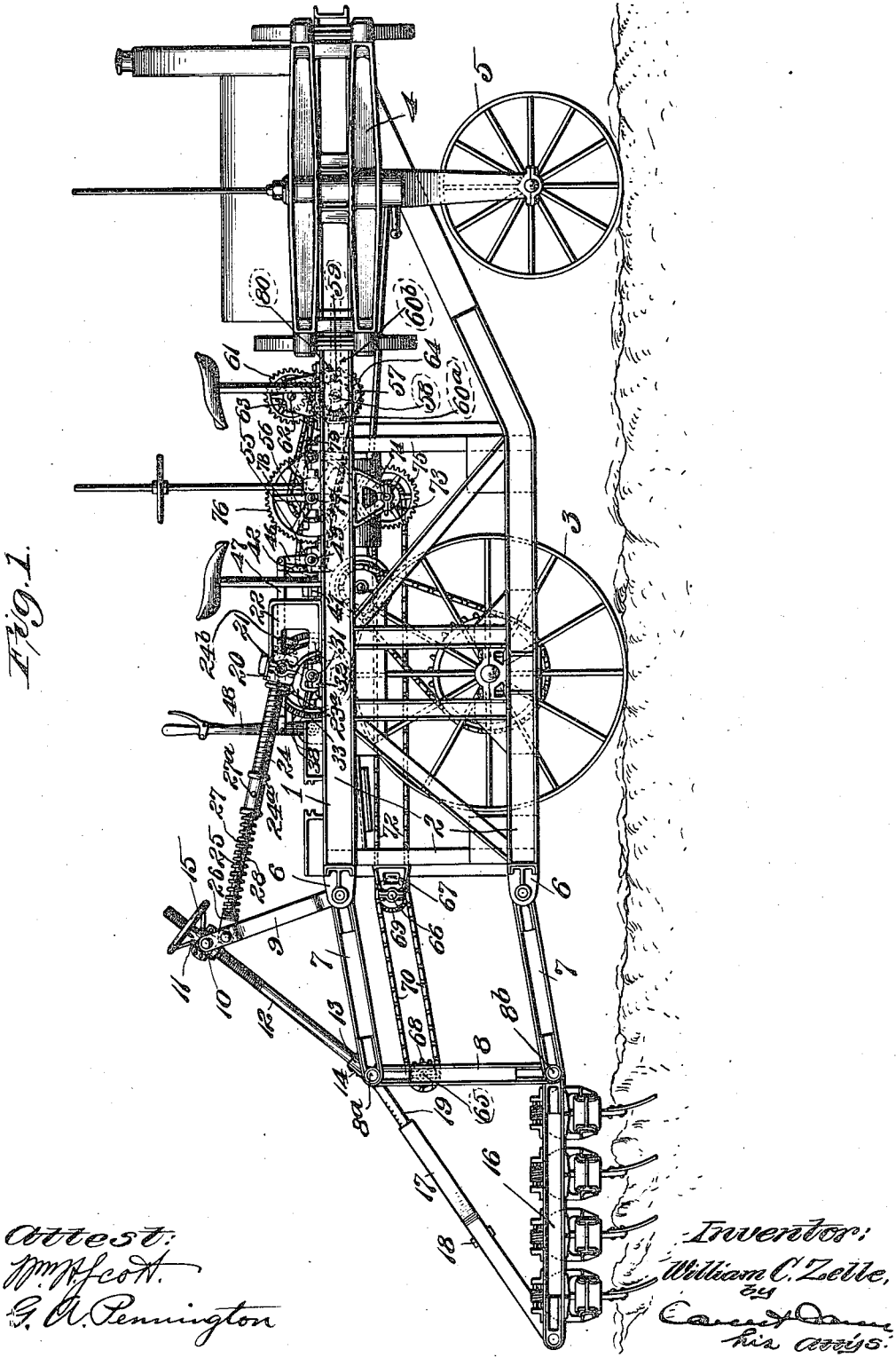

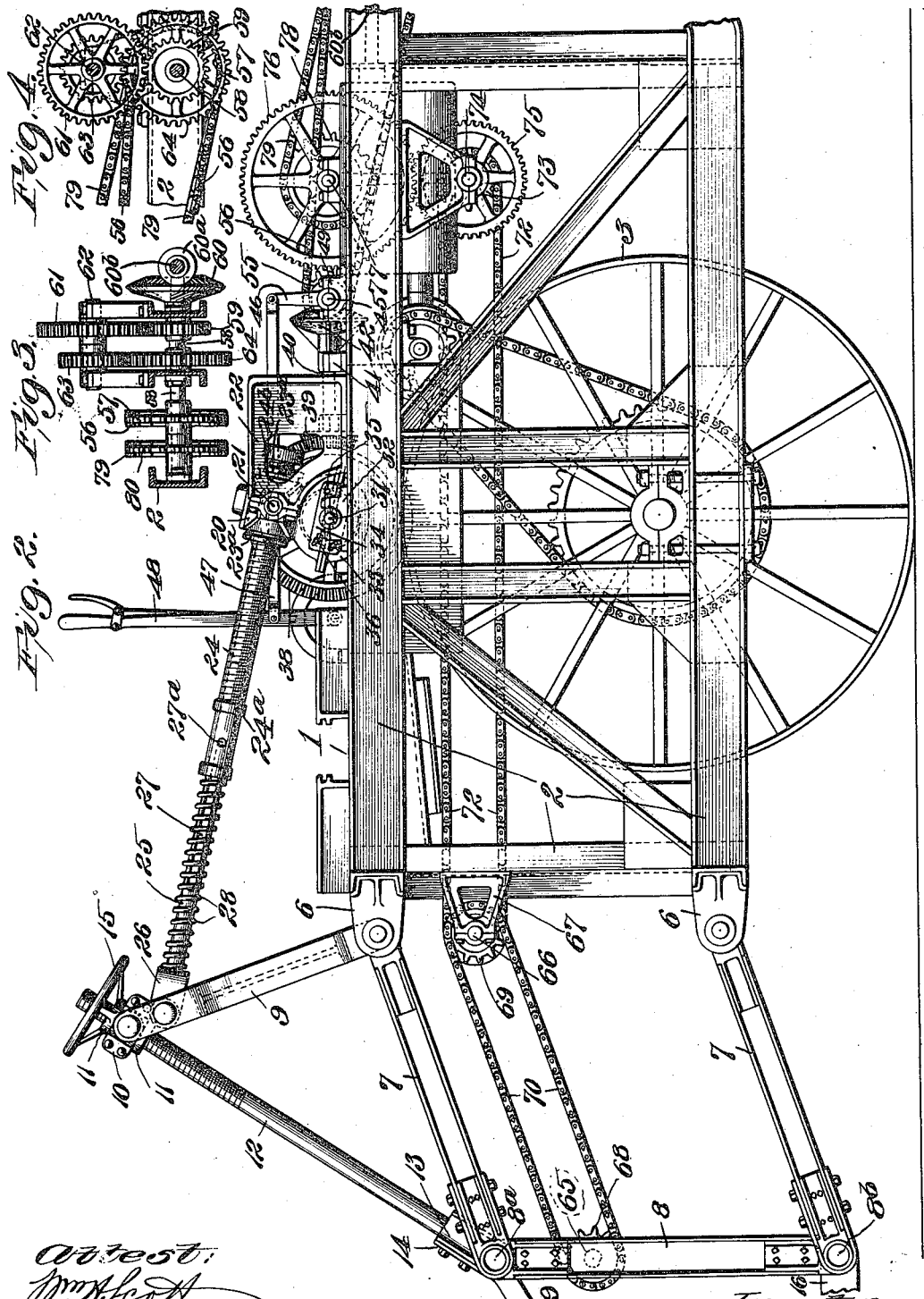

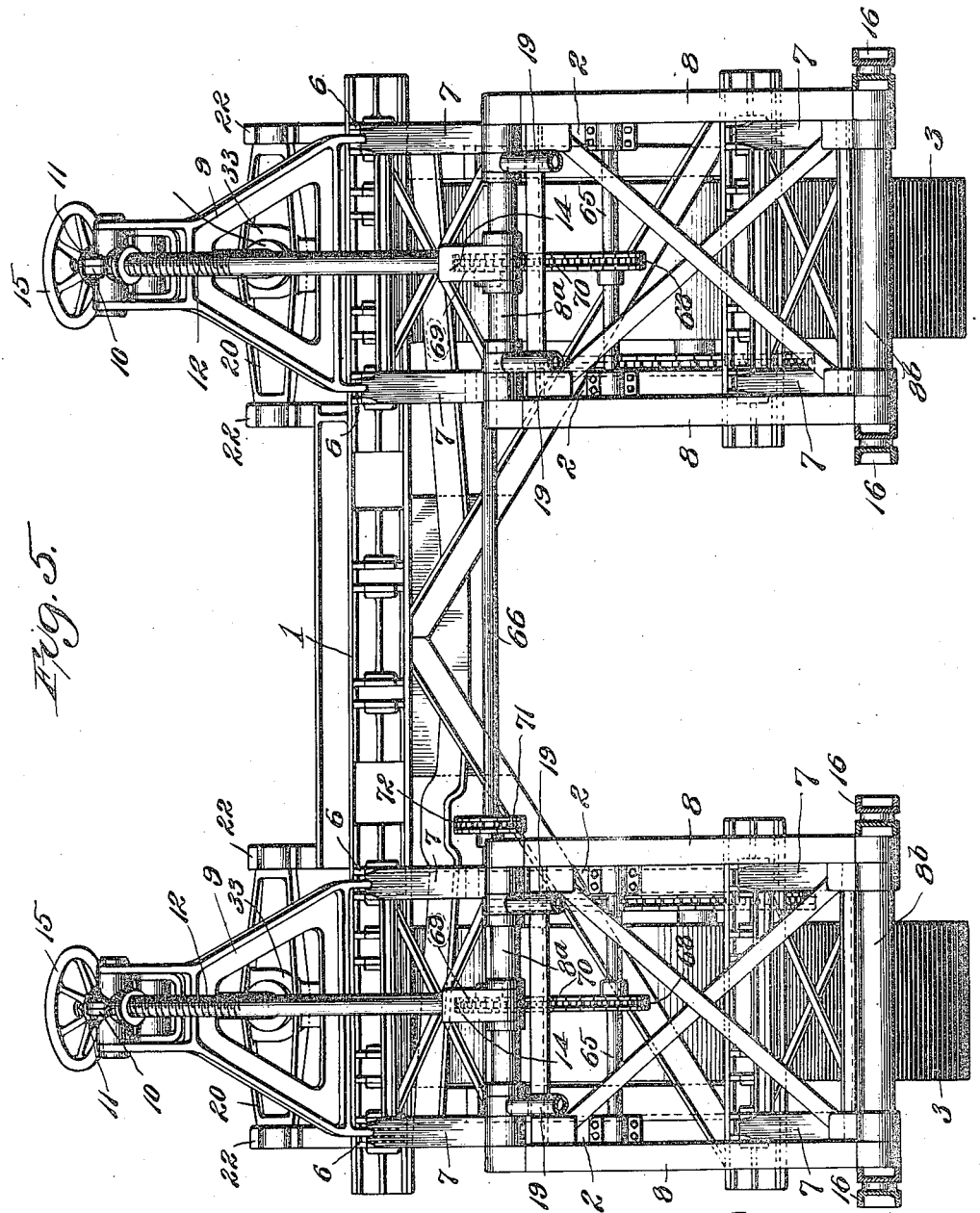

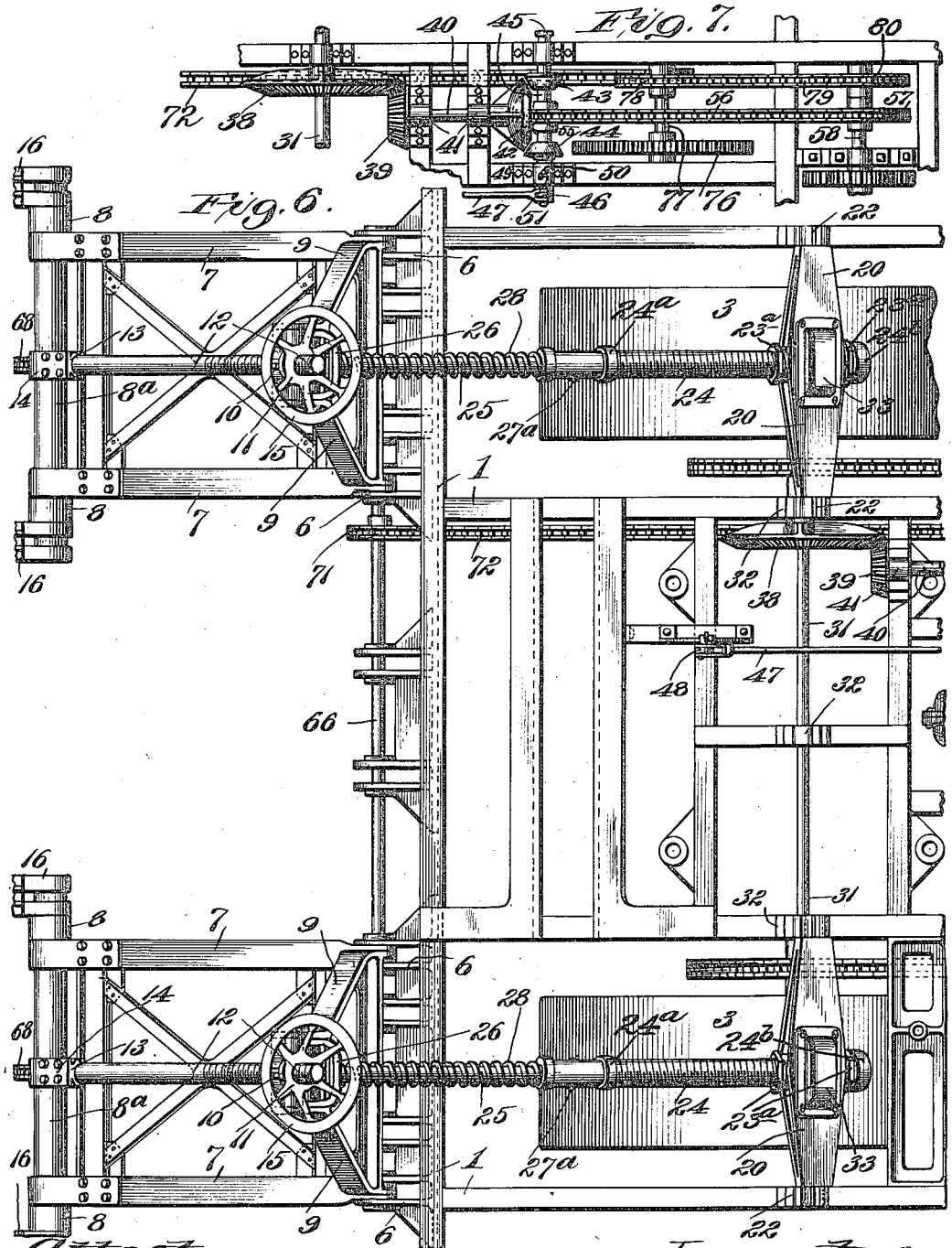

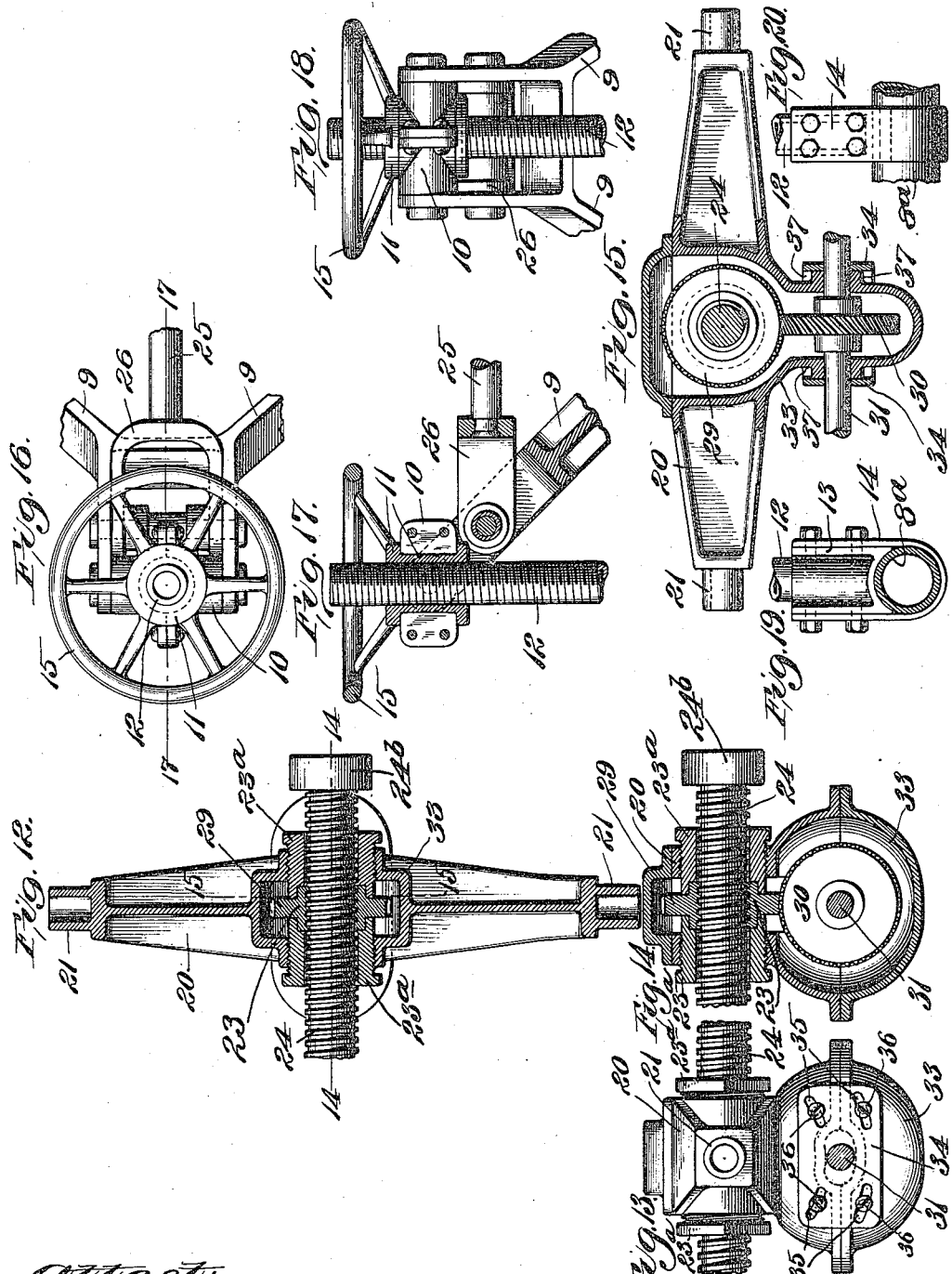

UNITED STATES PATENT OFFICE.

WILLIAM C. ZELLE, OF ST. LOUIS, MISSOURI, ASSIGNOR TO PLANTATION EQUIPMENT COMPANY, OF ST. LOUIS, MISSOURI, A CORPORATION OF MISSOURI.

TILLING-MACHINE.

1,230,261.   Specification of Letters Patent.   Patented June 19, 1917.

Application filed June 17, 1912. Serial No. 704,036.

*To all whom it may concern:*

Be it known that I, WILLIAM C. ZELLE, a citizen of the United States, and a resident of the city of St. Louis and State of Missouri, have invented a certain new and useful Improvement in Tilling-Machines, of which the following is a specification.

This invention relates to machinery for tilling the soil. It has for its principal objects to produce a motor-propelled machine adapted for plowing and otherwise breaking and treating the soil, both preliminary to planting and in the cultivation of growing crops; to directly support from a motor-propelled machine the soil-treating implements by a simple and efficient device which may be operated to lift all of the implements entirely out of the ground or to any desired height above the surface of the ground; to provide a simple and efficient mechanism for supporting the implements on a carriage and capable of adjustment and manipulation to secure a uniform tillage to any desirable depth; and to attain certain advantages which will hereinafter more fully appear.

The invention consists in the parts and in the arrangements and combinations of parts hereinafter described and claimed.

In the accompanying drawings which form part of this specification and wherein like symbols refer to like parts wherever they occur,—

Figure 1 is a side elevation of a machine illustrating an embodiment of the invention;

Fig. 2 is an enlarged fragmentary view in side elevation, of the end portion of the machine;

Figs. 3 and 4 are fragmentary detail views showing an arrangement of speed reducing gears for transmitting power from the engine shaft to the raising and lowering mechanism and for driving power-actuated implements;

Fig. 5 is a rear elevation;

Fig. 6 is a fragmentary top plan view of the rear portion of the machine;

Fig. 7 is a fragmentary top plan view of a portion of the machine adjacent to that shown in Fig. 6;

Fig. 8 is a substantially horizontal section taken just below the parts shown in Fig. 6;

Fig. 9 is a fragmentary view showing the reversing clutch of the raising and lowering mechanism for the implement holder support;

Fig. 10 is a section taken on the line 10—10 of Fig. 9;

Fig. 11 is a section taken on the line 11—11 of Fig. 9;

Fig. 12 is a horizontal section through the swivel member in which the operating nut for the screw of the raising and lowering mechanism is mounted;

Fig. 13 is an end view of said swivel member;

Fig. 14 is a section on the line 14—14 of Fig. 12;

Fig. 15 is a view partly in elevation and partly in section on the line 15—15 of Fig. 12;

Fig. 16 is a fragmentary view looking toward the end of the adjusting screw of the implement support, showing the mounting of the operating nut and member which telescopes with the screw of the raising and lowering mechanism;

Fig. 17 is a section on the line 17—17 of Fig. 16;

Fig. 18 is a view similar to Fig. 16, but looking toward the side of the screw; and, Figs. 19 and 20 are fragmentary views showing the manner of mounting the pivot end of the adjusting screw.

The machine illustrated in the drawings is shown as comprising a carriage or tractor whose construction is set forth with particularity in an application filed by me on April 1, 1912, Serial No. 687,929. Generally described, the tractor comprises a structural platform or body frame 1 mounted at one end on pedestal side frames 2, in which latter are located the propelling traction wheels 3. The opposite end portion of the platform frame is mounted on an auxiliary carrier frame 4 which in turn is supported on caster wheels 5 whereby the machine may be steered and turned. The specific construction and arrangement of the tractor by itself forms no part of the present invention and no further description thereof will be given in the present application except as to such parts that are necessary to the full understanding of the invention or enter into the combinations of the claims.

Brackets 6 are mounted on the rear end of the platform frame 1 and also at the bottom of the pedestal side frames. These brackets are provided with bearing portions whose axes are in the same vertical plane; and pivotal members or links 7 are journaled on these brackets. These links 7 are arranged in pairs in vertical planes, and between the upper and lower links 7 of each pair extends a vertical member or bar 8. The pairs of links 7 are connected together two and two by upper and lower tubular cross rods 8ª and 8ᵇ which pivotally connect the vertical members 8 to the other ends of the corresponding pair of links 7, the distance between the centers of the axes of the pivots being the same as the distance between the axes of the bearings on the brackets 6 so that said members 7 move in parallel relation to each other. Each two connected pairs of links 7, the corresponding vertical members 8 and the cross rods 8ª and 8ᵇ constitute a hinged parallelogram frame, of which there are two altogether.

Yokes or rocking arms 9 are also journaled on the brackets 6 and have swivel blocks 10 mounted on their outer ends. Working in the swivel blocks are nuts 11 through which are threaded screws 12 whose lower ends are journaled on the upper cross rods 8ª of the parallelogram frames.

The screws 12 may be conveniently mounted by providing blocks 13 on the ends thereof having concaved portions corresponding to the curvature of the cross rods 8ª, and providing straps 14 about said rods and securing the end portions to the opposite sides of said blocks. Each nut 11 is provided with a handwheel 15 whereby it can be easily rotated.

Implement carrier frames or implement holders 16 are pivotally connected at one end to the lower cross rods 8ᵇ of the parallelogram frames and at their outer ends to yokes 17 having nuts 18 swiveled thereon in which work the screw-threaded portions of rods 19 which are pivotally connected to the cross rods 8ª of the parallelogram frames. The construction of the implement holder is set forth more fully in a separate application Serial No. 704,037 filed herewith. By turning the nuts 18 the rods 19 are moved longitudinally in either direction, thereby tilting the implement holder frames to any desirable angle.

By turning the handwheels 15, the members 7 will be raised and lowered in parallel relation, the frames 8 being maintained in vertical position at all times and the implement carrier frames 16 also remaining in the position to which they are adjusted with respect to said members 8. Hence, the implement holder frames may be set in horizontal position or at an inclination either upward or downward from the pivot rod 8ᵇ, and by adjusting the rocking arms 9 the implements may be made to enter the ground to any desirable depth.

Swivel members 20 having trunnions 21 are mounted on bearings 22 on the carriage frame. These members 20 have nuts 23 swiveled therein and working through the nuts are screws 24. These screws are tubular, and telescoping therewith are rods 25 whose outer ends are bifurcated as at 26 and pivoted to the yokes 9. The rods are provided with longitudinal slots 27 through which transverse pins 27ª on the tubular screws pass. By this arrangement the rod and screw are permitted longitudinal movement with respect to each other but are prevented from rotating independently.

Springs 28 are coiled about said rods 25 between the bifurcated end portions 26 thereof and the outer ends of said tubular screws 24 so that their force is exerted to yieldingly hold the rods extended, the outermost position of the rods being limited by the inner ends of the slots 27 contacting with said pins 27ª. The springs are made sufficiently strong to prevent the implements from riding out of the soil, but are adapted to yield in case either of the wheels 3 of the tractor drop into a depression or the wheels 5 ride up over a hump of such proportions that the supporting mechanism or the implements might be damaged thereby. By this arrangement the rear portion of the tractor may drop a considerable distance or the front portion may rise without affecting the position of the implements in the soil or causing damage to them or the carrier mechanism.

Each of the nuts 23 which are journaled in the swivel supports 20 is provided with a spiral gear 29. This spiral gear meshes with another spiral gear 30 fixed on a shaft 31 extending transversely of the machine and journaled in bearings 32 on the platform in a plane below the bearings 22 for the swivel supports 20. For convenience is assembling and adjustment, the nuts 23 are preferably journaled in the ends of screw-threaded bushings 23ª.

The swivel members are provided with housings 33 which inclose the gears 29 and 30 so as to exclude dust and grit and also provide chambers to hold a lubricant for the gears.

In order to permit of a slight swinging movement of the housings 33, the openings through which the shaft 31 passes are elongated and enlarged diametrically; and to prevent dust from entering the housings, cover-plates 34 are provided. These cover-plates have perforations which fit the shaft 31 snugly and arcuate slots 35 are provided in the plates through which screws 36 are inserted into bosses 37 on the outer faces of the housings. By this means the plates remain stationary with the shaft while the housing is free to move. The rocking motion is very slight at the point where the spiral gears 29 and 30 mesh, and the shape of the teeth and play between them is such that the movement is not hindered.

The shaft 31 has a bevel gear 38 fixed thereon which meshes with a bevel pinion 39 fixed on a propeller shaft 40 extending longitudinally of the machine and journaled in bearings 41 (see Fig. 7). On the propeller shaft is fixed a friction cone 42 which is adapted to be engaged alternately by friction cones 43 and 44 on a reciprocatory clutch shaft 45. This clutch shaft is operated by a lever arm 46 which is connected by a link 47 to an operating lever 48. The clutch is arranged so that when the lever 48 is in vertical position the clutch cones 43 and 44 are both out of engagement with the cone 42. The clutch may be operated in any suitable manner, but as shown more clearly in Figs. 9 and 11, it is of the cam-actuated type. That is, a bearing 49 is provided with a diagonal slot 50 through which a pin 51 on a sleeve 52 projects. This sleeve 52 is mounted to rotate freely in the bearing and also upon the shaft, and the lever arm 46 is rigidly connected to the sleeve, while collars 53 and 54 are fixed on the shaft 45 at opposite ends of the sleeve. Consequently, when the lever arm is rocked in either direction the sleeve is caused to move lengthwise through the bearing. Therefore, the shaft is also moved longitudinally therewith to bring either of the cones 43, 44 into contact with the cone 42 according to the direction the lever 48 is moved.

The shaft 45 carrying the friction clutch cones 43 and 44 is provided with a sprocket wheel 55 which is driven by a chain 56 connecting it with a sprocket wheel 57 on a countershaft 58; and to facilitate mounting the first mentioned sprocket wheel 55 midway between the cones 43 and 44, the cone 42 is hollowed out to give the necessary clearance required to allow said sprocket wheel 55 to shift sidewise with the shaft 45 as well as rotate therewith. The countershaft 58 may derive its motion from the engine shaft through the medium of any obvious speed reducing gear. Hence, only a single motor need be employed for propelling the machine and operating the various power devices thereon.

As shown in Figs. 3 and 4, the speed reducing gear comprises a pinion 59 having a bevel gear 60 fixed thereto, both being loose on the countershaft 58. The pinion 59 meshes with a gear 61 fixed on a shaft 62 above it, which shaft 62 has a pinion 63 fixed thereon and meshing with a gear 64 fixed on the countershaft 58. The bevel gear 60 meshes with a bevel pinion 60$^a$ on the engine shaft 60$^b$ (see Figs. 1, 2 and 3).

As above stated, the two clutch cones 43, 44 are normally out of contact with the cone 42 so that the shaft 45 may be driven continuously. Therefore, when it is desired to raise the implement holders or drag frames, it is only necessary to move the controlling lever 48 in the direction to throw the particular clutch cone 43 or 44 into contact with the cone 42 so as to rotate the nuts 23 in the proper direction to pull the screws 24. When the implement holders have reached the desired elevation, the lever 48 is restored to neutral position, thereby shifting the friction cones to neutral position, the other parts remaining in the position they have just reached, until the lever is thrown in the reverse direction and the nuts 23 are rotated in the direction to move the screws 24 outward to lower the implement holders.

The endwise movement of the screws 24 is limited by collars 24$^a$ and 24$^b$ at their ends which are adapted to contact with the swivel bushings 23$^a$. Thus, in case the operator fails to restore the controlling lever at the proper time, the collars serve to stop the movement of the screws and operating gears back to the friction cone 42, the cone 43 or 44, as the case may be, slipping on said cone 42 and permitting the power transmission to continue operating.

In order to drive power-actuated implements, transverse shafts 65 are journaled on the vertical members 8, with their axes in line with the axes of the cross rods 8$^a$ and 8$^b$, and a shaft 66 extending the entire width of the machine is journaled on brackets 67 at the rear of the pedestal side frames 2 in line with the axes of the bearings in the brackets 6. On these shafts are fixed sprocket wheels 68 and 69, respectively, which are connected by a sprocket chain 70. The shafts 65 and 66 are located at the same relative distance between the respective pivots of the parallelogram frame, so that their correlation is not disturbed when said parallelogram frame is moved up or down. The shaft 66 is provided with a sprocket wheel 71 which is driven by a sprocket chain 72 running over a sprocket wheel 73 fixed on a shaft 74. This shaft 74 is provided with a spur gear 75 which meshes with a larger gear 76 on a shaft 77 vertically above it. The second mentioned shaft 77 has a sprocket wheel 78 fixed thereon and driven by a sprocket chain 79 running around a sprocket wheel 80 fixed on said countershaft 58.

The power-actuated implements may be colters, disks, stubble shavers, cotton choppers, etc. In fact, numerous devices which of themselves form no part of the present invention and are not shown in the drawings, it being deemed sufficient for the purpose of this specification to merely state that the power may be taken in any suitable manner from the shafts 65, and tnat said shafts may be geared to rotate at any desirable speed.

What I claim is:

1. In a machine of the character described, a tractor having a body frame, a hinged parallelogram frame pivotally connected to said body frame and projecting from the rear thereof, an implement holder frame adjustably supported from said parallelogram frame, an arm pivotally mounted on the body frame of said tractor to swing vertically, an adjustable link connecting said parallelogram frame and said arm, and means for swinging said arm, said means having a determinate range of movement.

2. In a machine of the character described, the combination with a traveling carriage, of an implement holder, means for supporting said implement holder on said carriage in a particular working position relative to the ground, said means including an adjusting device for varying the location of the implement holder above the ground without disturbing its particular working relation, and a device coöperating with said adjusting device to support said holder and being yieldable in one direction to permit independent vertical movement of the carriage downward and the implement holder upward.

3. In a machine of the character described, the combination with a traveling carriage, of an implement holder, means for supporting said implement holder comprising a hinged parallelogram frame, an adjusting device coöperating with said implement holder and said parallelogram frame for adjusting the implement holder for a particular working relation, and means for raising and lowering said parallelogram frame without disturbing the particular working relation of the implement holder, said means including a yielding device whereby the carriage and implement holder are permitted independent vertical movement in one direction respectively.

4. In a machine of the character described, the combination with a traveling carriage, of an implement holder, means for supporting said implement holder comprising upright frame members, parallel upper and lower members hinged at one end to the upright frame members and at their opposite ends to the carriage, a yoke pivoted at one end to said carriage and having a swivel block at its opposite end, a nut rotatably fitted in said swivel block, a rod pivoted at one end to the upright frame members and having its opposite end portion screw-threaded and fitted in said nut, a second rod pivoted to said yoke, and means coöperating with said last mentioned rod for raising and lowering said implement holder.

5. In a machine of the character described, the combination with a carriage, of an implement holder, and a support for said holder comprising a hinged parallelogram frame mounted on said carriage, an adjustable link device hinged on said carriage and operatively connected with said parallelogram frame, a swivel member mounted on said carriage, a connection between said adjustable link device and said swivel member including a nut swiveled on said swivel member transversely to the axis of the latter and a screw working endwise through said nut, and means for rotating said nut.

6. In a machine of the character described, the combination with a carriage, of an implement holder, and a support for said holder comprising a hinged parallelogram frame mounted on said carriage, an adjustable link device hinged on said carriage and operatively connected with said parallelogram frame, a swivel member mounted on said carriage, a connection between said adjustable link device and said swivel member including a nut swiveled on said swivel member transversely to the axis thereof, a screw working endwise through said nut, a rod hinged to said adjustable link device and slidably engaging said screw, resilient means for holding said rod and screw normally in extended relation, and means for rotating said nut.

7. In a machine of the character described, the combination with a carriage, of an implement holder, and a support for said holder including a hinged parallelogram frame mounted on said carriage, an adjustable link device hinged on said carriage and operatively connected to said parallelogram frame, a swivel member mounted on said carriage, a nut swiveled on said swivel member at right angles to the axis of the latter, a tubular screw working endwise through said nut, a rod hinged to said adjustable link device and fitted slidably in said screw, said rod and screw having a slot and pin connection whereby they are held from rotating independent of each other but are permitted endwise movement with respect to each other, and means for rotating said nut.

8. In a machine of the character described, a tractor having a body frame carried on traction wheels, a hinged parallelogram frame pivotally connected to said body frame adjacent to said traction wheels, an implement holder frame pivotally connected at one end to said parallelogram frame and extending substantially horizontally, an adjustable brace connecting said implement holder frame and said parallelogram frame, and power driven means mounted on said tractor and having a resilient connection to said parallelogram frame for raising and lowering said parallelogram frame.

9. In a machine of the character described, a tractor adapted for straddle row cultivation, a hinged parallelogram frame pivotally connected to said tractor near each side thereof, an implement holder frame adjustably supported from each parallelogram frame and extending substantially horizontally, arms pivotally mounted on said tractor, adjustable means connecting each of said arms and the corresponding parallelogram frame, and means for swinging said arms, said means having a determinate range of movement.

10. In a machine of the character described, the combination with a carriage, of a hinged parallelogram frame mounted on said carriage so as to swing vertically, an implement holder frame hinged at one end to said parallelogram frame so as to swing vertically, an adjustable connection between the opposite end of said implement holder frame and said parallelogram frame whereby said implement holder frame may be supported horizontally or at an inclination, an adjustable link device hinged on said carriage and operatively connected to said parallelogram frame, and means coöperating with said adjustable link device for supporting and for raising and lowering said parallelogram frame.

11. In a machine of the character described, the combination with a carriage, of a hinged parallelogram frame mounted on said carriage so as to swing vertically, an implement holder frame hinged at one end to said parallelogram frame so as to swing vertically, an adjustable connection between the opposite end of said implement holder frame and said parallelogram frame whereby said implement holder frame may be supported horizontally and also at an inclination, an adjustable link device comprising a member pivoted on said carriage and a member pivoted to the parallelogram frame, one of said members having a swivel block thereon, said block having a nut swiveled therein transverse to the axis thereof, and the other member having a screw portion working through said nut, and means on said carriage coöperating with said adjustable link device for supporting and for raising and lowering said parallelogram frame with the implement holder frame thereon.

12. In a machine of the character described, the combination with a carriage, of a hinged parallelogram frame mounted on said carriage so as to swing vertically, an implement holder frame hinged at one end to said parallelogram frame so as to swing vertically, an adjustable connection between the opposite end of said implement holder frame and said parallelogram frame, whereby said implement holder frame may be supported horizontally and also at an inclination, an adjustable link device comprising a member hinged on said carriage and a member pivoted to the parallelogram frame, one of said members having a swivel block thereon, said block having a nut swiveled therein transverse to the axis thereof, and the other member having a screw portion working through said nut, a rod hinged at one end to said adjustable link device, a tubular screw sleeved on said rod, said screw and rod being connected so that they may move lengthwise with respect to each other but are interlocked against rotation, a horizontal swivel member on said carriage, a nut swiveled on said swivel member transverse to the axis thereof and working on said tubular screw, and means for rotating said nut.

13. In a machine of the character described, the combination with a carriage, of a hinged parallelogram frame mounted on said carriage so as to swing vertically, an implement holder frame hinged at one end to said parallelogram frame so as to swing vertically, an adjustable connection between the opposite end of said implement holder frame and said parallelogram frame, whereby said implement holder frame may be supported horizontally and also at an inclination, an adjustable link device comprising a member hinged on said carriage and a member pivoted to the parallelogram frame, one of said members having a swivel block thereon, said block having a nut swiveled therein transverse to the axis thereof, and the other member having a screw portion working through said nut, a bar hinged at one end to said adjustable link device, a tubular screw sleeved on said bar, said screw and bar being connected so that they may move lengthwise with respect to each other but are interlocked against rotation, said rod having a shoulder and a spring coiled thereon and acting against said shoulder and the end of said tubular screw, a horizontal swivel member on said carriage, a nut swiveled on said swivel member transverse to the axis thereof and working on said tubular screw and means for rotating said nut.

14. In a machine of the character described, the combination of a tractor, a hinged parallelogram frame pivotally connected to said tractor, an implement carrier frame pivotally connected to said parallelogram frame, an adjustable brace connection between said carrier frame and said parallelogram frame, and means for raising and lowering said parallelogram frame.

15. In a machine of the character described, the combination with a tractor, adapted for straddle row cultivation, of a pair of hinged parallelogram frames pivotally connected to the rear of said tractor, said parallelogram frames being disposed one upon each side of the longitudinal medial line of said tractor, an implement carrier frame pivotally connected at one end to each of said parallelogram frames, an adjustable connection between the other end of each implement carrier frame and the corresponding parallelogram frame, and means for simultaneously raising and lowering said parallelogram frames.

16. In a machine of the character described, a motor-driven vehicle having a frame, a hinged parallelogram frame pivotally connected to said vehicle frame, soil-treating implements supported by said parallelogram frame, a power-driven sprocket wheel journaled on said vehicle frame, a second sprocket wheel journaled on said parallelogram frame, the axes of said sprocket wheels being located in a line parallel with the rearwardly extending arms of said parallelogram frame, and a chain connecting said sprocket wheels.

17. In a machine of the character described, the combination with a tractor, of an implement carrier frame supported thereby, mechanism mounted on said tractor for raising and lowering said implement carrier frame, and adjustable and yieldable means connecting said carrier frame with said mechanism, said mechanism during the movement of lowering said carrier frame automatically stopping at a predetermined point to place said carrier frame at a predetermined position relative to the ground.

18. In a machine of the character described, the combination with a tractor having a frame, of two pairs of parallel upper and lower links, said pairs of links being arranged in parallel planes, pivots connecting one end of said upper and lower links to said frame, and a pair of vertical members pivoted by tubular members to the other ends of said pairs of links, said tubular members extending between the corresponding links of said pairs of links.

19. In a machine of the character described, the combination with a tractor, of a hinged parallelogram frame pivotally connected to said tractor, an implement carrier frame pivotally connected to said parallelogram frame, an adjustable brace connection between said parallelogram frame and said implement carrier frame and resilient means operatively connected to said parallelogram frame for raising and lowering said carrier frame, said means during the movement of lowering said carrier frame automatically stopping at a predetermined point.

20. In a machine of the character described, the combination with a tractor having a frame, of two pairs of parallel upper and lower links, said pairs of links being arranged in parallel planes, pivots connecting one end of said upper and lower links to said frame, a pair of vertical members pivoted by tubular members to the other ends of said pairs of links, a rocking member formed of two braced divergent arms, the divergent ends of said arms being mounted on said pivots first-mentioned, a brace pivoted at one end to one of said tubular members and adjustably connected to said rocking member and means for rocking said rocking member.

21. In a machine of the character described, a tractor having a body frame, a hinged parallelogram frame pivotally connected to said body frame, earth-working implements supported by said parallelogram frame, and resilient means operable by power derived from the motor which drives said tractor for raising and lowering said parallelogram frame, said means during the movement of lowering said parallelogram frame automatically stopping at a predetermined point.

Signed at St. Louis, Missouri, this 11th day of June, 1912.

WILLIAM C. ZELLE.

Witnesses:
G. A. PENNINGTON,
PAULINE AMBERG.